United States Patent
Robles Flores et al.

(10) Patent No.: US 11,161,362 B1
(45) Date of Patent: Nov. 2, 2021

(54) METHOD FOR ENHANCING FLUORESCENT IMAGES ON A SUBSTRATE

(71) Applicant: Xerox Corporation, Norwalk, CT (US)

(72) Inventors: Eliud Robles Flores, Rochester, NY (US); Andrew William Beams, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/015,671

(22) Filed: Sep. 9, 2020

(51) Int. Cl.
*B41M 3/06* (2006.01)
*G06K 15/00* (2006.01)
*B42D 25/387* (2014.01)

(52) U.S. Cl.
CPC .......... *B41M 3/06* (2013.01); *B42D 25/387* (2014.10); *G06K 15/407* (2013.01)

(58) Field of Classification Search
CPC ....... B41M 3/06; G06K 15/407; G06K 15/00; B42D 25/387
USPC .............. 40/124.01, 124.191, 584; 281/2, 5; 283/67, 70, 72, 74, 85, 91, 94, 98, 901
See application file for complete search history.

(56) References Cited

U.S. PATENT DOCUMENTS

2004/0238096 A1 * 12/2004 Cooper .................. G09F 13/20
156/71

\* cited by examiner

*Primary Examiner* — Justin V Lewis
(74) *Attorney, Agent, or Firm* — Simpson & Simpson, PLLC; Michael Nicholas Vranjes

(57) ABSTRACT

A method of enhancing a fluorescent image on a substrate, the method including forming the fluorescent image on the substrate, the fluorescent image including a fluorescent marking material, forming a border on the substrate adjacent to the fluorescent image, the border including a non-fluorescing marking material and a thickness, wherein the border at least partially circumscribes the fluorescent image.

9 Claims, 5 Drawing Sheets

METHOD FOR ENHANCING FLUORESCENT IMAGES ON A SUBSTRATE

FIELD

The present disclosure relates to the field of printing, and more particularly, to the field of printing fluorescent images on a substrate, and even more particularly, to enhancing printed fluorescent images on a substrate.

BACKGROUND

Fluorescent toners/inks are designed to transform the invisible UV component of incident light into visible light at a specific wavelength of a visible color, as is shown in FIG. 1. FIG. 1 is a schematic view of prior art light characteristics. Florescent toners/inks are reflective of UV light. The most widely used fluorescent colors are yellow, orange, pink, and green. Very often one sees these colors used in sports and safety applications. FIG. 1 shows that regular dry pink ink reflects the color pink and absorbs all other colors. Fluorescent dry pink ink reflects the color pink and the UV component and absorbs all other colors. Specifically, the fluorescent dry pink ink translates the UV component of the light source into visible energy.

Fluorescent yellow and fluorescent orange, due to their inherent brightness (medium to high L*), tend to pop very nicely creating extremely desirable special effects under both daylight and UB lights. Brightness is a variable known as Commission Internationale de l'Eclairage—International Commission on Illumination (CIE) L* or L*. Fluorescent pink and fluorescent green however tend to not be as fluorescing as yellow and orange because of their lower brightness range (medium to low L*). In addition, pink for example typically only pops under UV light but under daylight they only rely on unique color to stand out. This is why in the table below there are many pink hues, finding unique color to stand out. Fluorescent pink competes with white from the substrate or media, which undermines its low fluorescence nature (i.e., fluorescent pink on a white substrate looks like just another color without any fluorescence). Therefore, when designing images for fluorescent pink and any other low fluorescing toners/inks one must rely on image tricks to make them pop and maximize their fluorescing capability.

The table below shows brightness and fluorescence strength data for various XEROX® fluorescent toners.

| Fluorescent Toner | Toner Hue/Type | Brightness (L*) | Fluorescence Strength (M1-M0 Max Reflection) | Grade |
|---|---|---|---|---|
| Fluorescent Yellow | FY | 97.12 | 23.43 | Ideal |
| Fluorescent Orange | FO49 Light | 74.47 | 40.59 | Ideal |
| Fluorescent Pink | FP49-M | 64.20 | 14.91 | Acceptable |
| | FP49-0 Dry | 66.79 | 18.30 | Acceptable |
| | FP149/49-O | 65.67 | 9.38 | Marginal |
| | FP149-O | 68.88 | 8.47 | Marginal |
| Fluorescent Green | FG | 73.80 | 7.86 | Marginal |

Therefore, there is a long felt need for a system and method for enhancing fluorescent toners and inks, specifically low fluorescing toners and inks such as pink and green (or any low fluorescing toners and inks) by manipulation during printing.

SUMMARY

According to aspects illustrated herein, there is provided a method of enhancing a fluorescent image on a substrate, the method comprising forming the fluorescent image on the substrate, the fluorescent image comprising a fluorescent marking material, forming a border on the substrate adjacent to the fluorescent image, the border comprising a non-fluorescing marking material and a thickness, wherein the border at least partially circumscribes the fluorescent image.

In some embodiments, the border is formed abutting the fluorescent image. In some embodiments, the border is formed adjacent the fluorescent image, with a gap arranged between the border and the fluorescent image.

In some embodiments, the step of forming a border on the substrate comprises forming the border on the substrate such that the border completely encloses the fluorescent image. In some embodiments, the step of forming a border on the substrate comprises forming the border on the substrate such that the border partially encloses the fluorescent image. In some embodiments, the thickness is greater than or equal to 0.25 mm. In some embodiments, the fluorescent marking material is a low fluorescing color. In some embodiments, the non-fluorescing marking material is yellow. In some embodiments, the border comprises a halftone, the halftone being greater than or equal to 30%. In some embodiments, the thickness is nonconstant.

According to aspects illustrated herein, there is provided a method of enhancing a fluorescent image on a substrate, the method comprising receiving, by one or more computer processors, input data related to one or more images to be printed, determining, by the one or more computer processors, whether fluorescent ink is required for the one or more images to be printed, if fluorescent ink is required, determining, by the one or more computer processors, whether fluorescent ink enhancement is desired, and if fluorescent ink enhancement is desired, adding, by the one or more computer processors, fluorescent ink enhancement data to the input data.

In some embodiments, the method further comprises printing, by the one or more computer processors, a final physical image. In some embodiments, the method further comprises, if fluorescent ink is not required, printing, by the one or more computer processors, a final physical image. In some embodiments, the method further comprises, if fluorescent ink enhancement is not desired, printing, by the one or more computer processors, a final physical image. In some embodiments, the method further comprises, if fluorescent ink enhancement is desired, determining, by the one or more computer processors, whether fluorescent ink enhancement is desired for the entirety of each of the one or more images. In some embodiments, the step of adding fluorescent ink enhancement data to the input data comprises adding, by the one or more computer processors, a border including a non-fluorescing yellow marking material at least partially circumscribing the one or more images. In some embodiments, the step of adding fluorescent ink enhancement data to the input data comprises adding, by the one or more computer processors, a yellow border at least partially circumscribing the one or more images and having a halftone level of greater than or equal to 30%. In some embodiments, the step of adding fluorescent ink enhancement data to the input data comprises adding, by the one or more computer processors, a yellow border at least partially circumscribing the one or more images and having a constant thickness that is greater than or equal to 0.25 mm. In some embodiments, the step of adding fluorescent ink enhancement data to the input data comprises adding, by the one or more computer processors, a yellow border at least partially circumscribing the one or more images and having a variable thickness that is greater than or equal to 0.25 mm.

According to aspects illustrated herein, there is provided an enhanced fluorescent image print, comprising a substrate, an image formed on the substrate and including a fluorescent marking material, and a border formed on the substrate abutting against the image, the border at least partially circumscribing the image and including a non-fluorescing yellow marking material.

In some embodiments, the border comprises a thickness that is greater than or equal to 0.25 mm. In some embodiments, the border comprises a halftone that is greater than or equal to 30%.

According to aspects illustrated herein, there is provided a method for enhancing the fluorescence effect of low fluorescing toners like pink and green by manipulating the surroundings of the toner/ink with non-fluorescing yellow. Yellow and purple are complementary colors. Complementary colors are pairs of colors which, when combined or mixed, cancel each other out (lose hue) by producing a grayscale color close to black but almost transparent. This is referred to herein as "color cancelling." This effect gives the impression that the pink surrounded by this color cancelling is "floating" creating a very much desired 3D-like effect. This effect happens when a UV light (purple-ish) is shined onto a print that has non-fluorescing yellow. The present disclosure proposes a method that leverages the complementary nature of yellow and purple to enhance fluorescent pink, green, or any other low fluorescing toner/inks.

In some embodiments, the method comprises determining an amount of yellow required around a fluorescent pink or green to enhance it. In some embodiments, the method comprises creating a border or halo around a fluorescent image. In some embodiments, the method comprises determining a thickness of the border. In some embodiments, the method comprises determining whether the border is to completely circumscribe the image or to only partially circumscribe the image.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
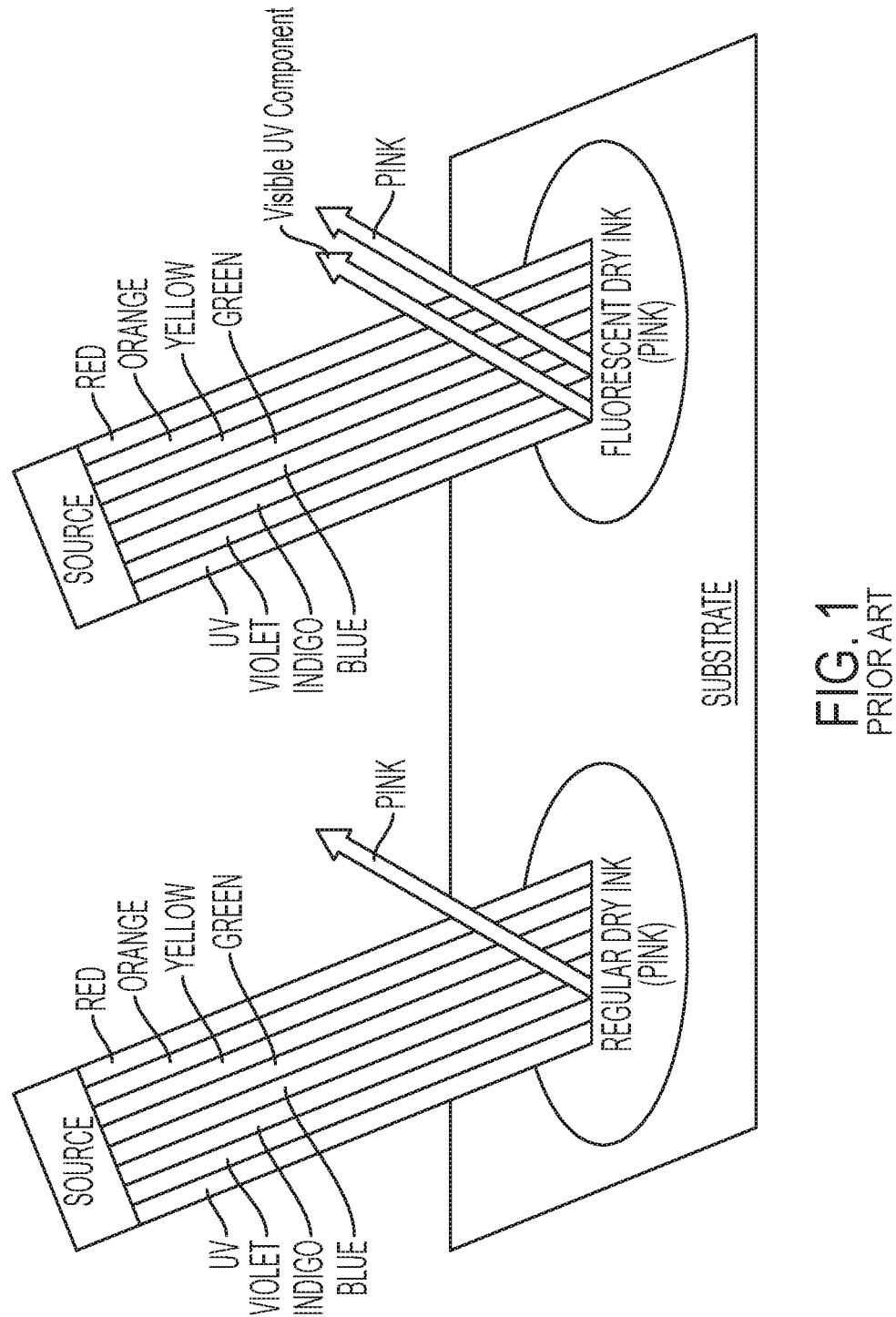
FIG. 1 is a schematic view of prior art light characteristics.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

"Printer," "printer system," "printing system," "printer device," "printing device," and "multi-functional device (MFD)" as used herein encompass any apparatus, such as a digital copier, bookmaking machine, facsimile machine, multi-function machine, etc., which performs a print outputting function for any purpose. Furthermore, as used herein, "sheet," "web," "substrate," "printable substrate," and "media" refer to, for example, paper, transparencies, parchment, film, fabric, plastic, photo-finishing papers or other coated or non-coated substrate media in the form of a web upon which information or markings can be visualized and/or reproduced.

As used herein, "fluorescence," "fluoresce," and "fluorescent" is intended to be broadly construed as capable of reflecting both visible and UV light.

As used herein, "image" and "printed image" is intended to be broadly construed as any picture, text, character, indicia, pattern or any other printed matter. Printed images can include but are not limited to logos, emblems, and symbols.

As used herein, "marking material" is intended to be broadly construed as encompassing both dry marking material or powder (i.e., toner) and liquid marking material (i.e., liquid ink).

Figure 2:
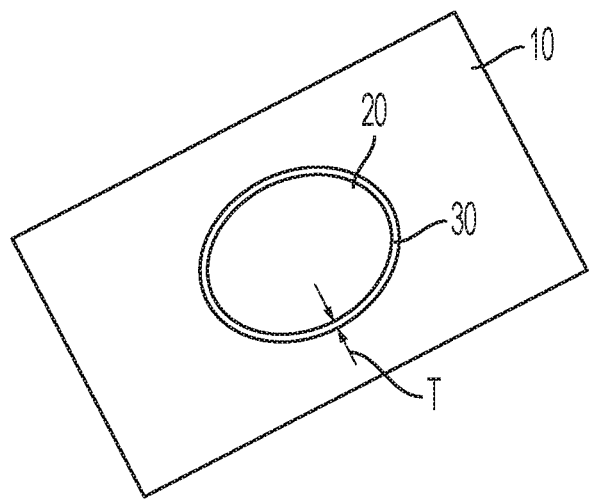
FIG. 2 is a perspective view of a substrate with an image printed thereon.

Referring now to the figures, FIG. 2 is a perspective view of substrate 10 with image 20 printed thereon. Substrate 10 comprises a normal paper color, for example, white. Image 20 comprises fluorescent marking material including a color other than white, for example, pink. As previously described, since fluorescent pink comprises a low fluorescence, especially when applied on a white substrate, it will not exhibit the same "pop" or characteristics as say fluorescent orange. As such, the instant invention modifies the image 20 to include border 30. Border 30 comprises a normal, non-fluorescing, marking material including a color that complements the purple-ish UV light, in this case, yellow, and includes thickness T. Complementary colors are pairs of colors which, when combined or mixed, cancel each other out (lose hue) by producing a grayscale color close to black but almost transparent. This is referred to as "color cancelling." This effect gives the impression that the pink surrounded by this color cancelling is "floating" creating a 3D-like effect. This effect occurs when a UV light (purple-ish) is shined onto a print that has non-fluorescing yellow. Upon application of UV light, the fluorescent pink of image 20 stands almost alone and "pops" off of substrate 10 due to color canceling that occurs between UV light and the non-fluorescing yellow border 30. In some embodiments, image 20 comprises fluorescent green marking material or another low fluorescing marking material. It should be appreciated that in some embodiments, image 20 may comprise a high fluorescing marking material such as fluorescent yellow or fluorescent orange marking material.

The present disclosure leverages the complementary nature of purple (i.e., the UV light) and yellow to enhance fluorescent pink, green, and other low fluorescing marking material. However, it is not necessary to print the low fluorescing marking material on a yellow substrate. Instead, and as shown in FIG. 2, a determination as to how much non-fluorescing yellow is needed around a fluorescent pink feature to enhance it.

The system of the present disclosure was tested to determine the optimal amount of non-fluorescing yellow needed in border 30 such that low fluorescing image 20, and the results are as follows.

Ten images of fluorescent pink patches having a 50% halftone were surrounded by various levels of a regular non-fluorescing yellow border or halo, having thicknesses ranging from 0.002" to 0.080" in steps of 0.009". Additionally, ten images of fluorescent pink patches having a 100% halftone were surrounded by various levels of a regular non-fluorescing yellow border or halo, having thicknesses ranging from 0.002" to 0.080" in steps of 0.009". A flicker test was then performed. A flicker test includes rapidly moving a UV light back and forth on the image to see if it flickers or shines. If the image flickers then color cancelling is taking place.

The chart below shows the flicker test results of border 30 having a 100% halftone non-fluorescent yellow marking material varying in thicknesses T, surrounding image 20 having fluorescent pink marking material.

| Line Thickness (inches) | Line Thickness (mm) | Flicker Test |
| --- | --- | --- |
| 0.009 | 0.2286 | No |
| 0.011 | 0.2794 | Maybe |
| 0.020 | 0.508 | Yes |
| 0.029 | 0.7366 | Yes |
| 0.038 | 0.9652 | Yes |
| 0.047 | 1.1938 | Yes |
| 0.56 | 1.4224 | Yes |
| 0.065 | 1.651 | Yes |
| 0.074 | 1.8796 | Yes |
| 0.083 | 2.1082 | Yes |

The results indicate that at 100% halftone, the non-fluorescing yellow border 30 must have a minimum thickness T of 0.25 mm in order to obtain the desired "pop" characteristics of fluorescent pink image 20 with respect to substrate 10.

The chart below shows the flicker test results of border 30 having a non-fluorescent yellow marking material with a constant thicknesses T of 0.083", surrounding image 20 having fluorescent pink marking material, and varying in halftone level.

| Halftone Level (%) | Flicker Test |
| --- | --- |
| 10 | No |
| 20 | No |
| 30 | Maybe |
| 40 | Yes |
| 50 | Yes |
| 60 | Yes |
| 70 | Yes |
| 80 | Yes |
| 90 | Yes |
| 100 | Yes |

The results indicate that at a constant thickness T of 0.083", the non-fluorescing yellow border 30 must have a minimum halftone level of 30% in order to obtain the desired "pop" characteristics of fluorescent pink image 20 with respect to substrate 10.

It should be appreciated that the minimum thickness T and/or halftone level of border 30 may change depending on a number of characteristics. For example, as the halftone level of border 30 increases, the minimum thickness T decreases (but not below 0.22 mm). As thickness T of border 30 increases, the minimum halftone level of border 30 decreases. It should be appreciated that the color of the substrate, namely, outside of image 20 and border 30, may ix) affect the minimum thickness T and/or halftone level of border 30.

It should be further appreciated that in some embodiments, thickness T of border 30 need not be constant. For example, it may be desired that certain features of image 20 stand out or pop more than other features of image 20. In such case, the thickness T of border 30 may be thicker around certain features and thinner around other features. Likewise, the halftone level of border 30 need not be constant. For example, the halftone level of border 30 near certain features may be higher than the halftone level around other features.

Figure 3:
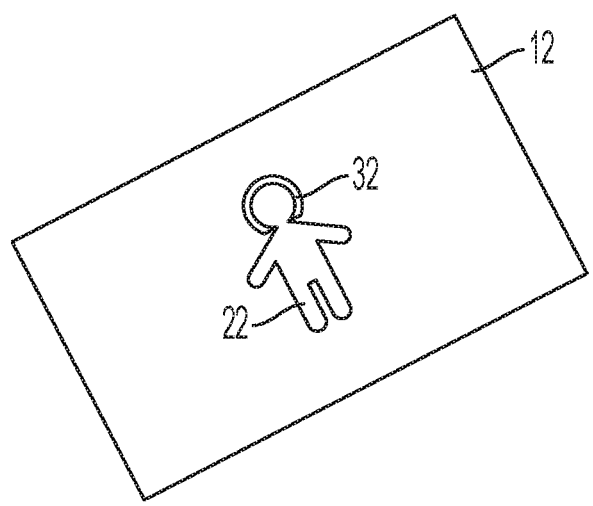
FIG. 3 is a perspective view of a substrate with an image printed thereon.

FIG. 3 is a perspective view of substrate 12 with image 22 printed thereon. Substrate 12 comprises a normal paper color, for example, white. Image 22 comprises fluorescent marking material including a color other than white, for example, pink (or green). As shown, border 32 is arranged only partially circumscribing image 22. The purpose for this is, as previously described, to accentuate certain features of image 22 over other features. Thus, in some embodiments, the system and method of the present disclosure may, after detecting the need for fluorescent marking material in image 22, not only determine whether fluorescent image enhancement is desired but also determine if enhancement of only specific features of image 22 is desired.

It should be appreciated that the addition of border 30, 32 at least partially circumscribing image 20, 22, respectively, greatly increases the contrast. The following examples should be read in view of FIG. 2.

In a first example, fluorescent pink image 20 is arranged on a white substrate 10 with no border and UV light is shined thereon. The level of reflection off of image 20 is 10 and the level of reflection off of substrate 10 is 1. Thus, the contrast is 9 (10 minus 1). A contrast of 9 is very low and does not give the pop that fluorescent marking material is intended produce.

In a second example, fluorescent pink image 20 is arranged on a non-fluorescing yellow substrate 10 with no border and UV light is shined thereon. The level of reflection off of image 20 is still 10 but the level of reflection off of substrate 10 is −50. The yellow substrate 10 turns into a "glassy" or grey look under UV light because it absorbs/cancels the blue/purple of UV light. Thus, the contrast is 60 (10 minus −50). A contrast of 60 is very high and provides the pop that fluorescent marking material is intended to produce.

In a third example, fluorescent pink image 20 is arranged on a non-yellow, non-fluorescing colored substrate 10 including a border 30 circumscribing therearound and UV light is shined thereon. The level of reflection off of image 20 is still 10, the level of reflection off of border 30 is −50, and the level of reflection off of substrate 10 varies. The level of reflection off of substrate 10 is not important since it is the contrast between image 20 and border 30 that will create the pop. The yellow border 30 turns into a "glassy" or grey look under UV light because it absorbs/cancels the blue/purple of UV light. Thus, the contrast is 60 (10 minus −50). A contrast of 60 is very high and provides the pop that fluorescent marking material is intended to produce.

Figure 4:
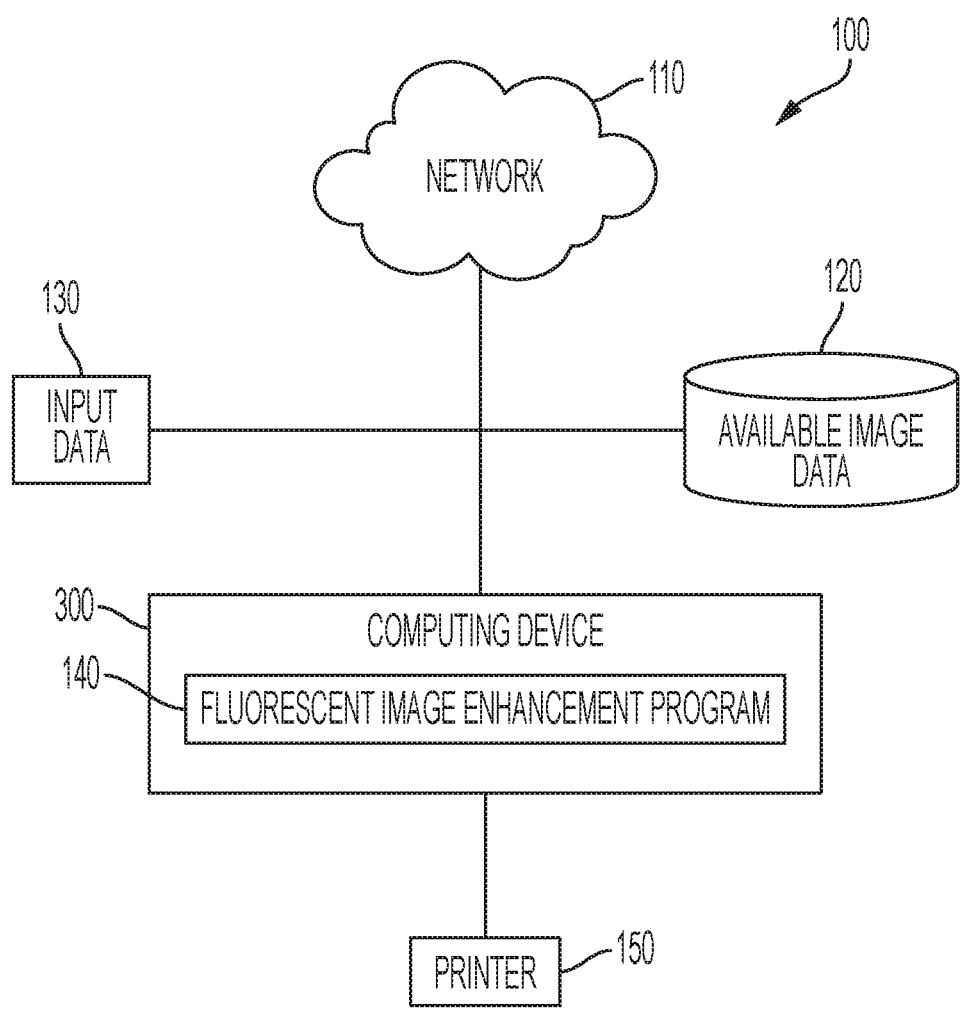
FIG. 4 is a functional block diagram illustrating an environment, in accordance with some embodiments of the present disclosure.

FIG. 4 is a functional block diagram illustrating fluorescent image enhancement environment 100, in accordance with some embodiments of the present disclosure. FIG. 4 provides only an illustration of one implementation, and does not imply any limitations with regard to the environments in which different embodiments may be implemented. Many modifications to the depicted environment may be made by those skilled in the art without departing from the scope of the disclosure as recited by the claims. In some embodiments, fluorescent image enhancement environment 100 includes computing device 300, a database or available image data 120, and user input data 130 all of which are connected to network 110. In some embodiments, fluorescent image enhancement environment 100 further comprises printer 150, which communicates with computing device 300 and/or fluorescent image enhancement program 140.

Network 110 can be, for example, a local area network (LAN), a wide area network (WAN) such as the Internet, or a combination of the two, and can include wired, wireless, or fiber optic connections.

Computing device 300 may be a hardware device that receives input data related to a requested print based on available image data 120 and/or input data 130 and adjusts the input data depending on any desired fluorescent image enhancement using fluorescent image enhancement program 140. Computing device 300 is capable of communicating with network 110, available image data 120, and input data 130. In some embodiments, computing device 300 may include a computer. In some embodiments, computing device 300 may include internal and external hardware components, as depicted and described in further detail with respect to FIG. 6. In some embodiments, fluorescent image enhancement program 140 is implemented on a web server, which may be a management server, a web server, or any other electronic device or computing system capable of receiving and sending data. The web server can represent a computing system utilizing clustered computers and components to act as a single pool of seamless resources when accessed through a network. The web server may include internal and external hardware components, as depicted and described in further detail with respect to FIG. 6.

Fluorescent image enhancement program 140 receives requests for prints in the form of input data. Fluorescent image enhancement program 140 can receive requests for prints and detect, within the request data (i.e., input data 130), whether fluorescent ink is required. For example, in some embodiments, print requests are sent to available image data 120 via input data 130 (e.g., from one or more users in a network). Fluorescent image enhancement program 140 communicates with available image data 120 to retrieve such print requests and then determines whether fluorescent ink is required therein. If fluorescent ink is required, fluorescent image enhancement program 140 then prompts the user as to whether enhancement of the fluorescent image is required. If, based on the user input, fluorescent image enhancement is desired, fluorescent image enhancement program 140 is capable of modifying the original print request input data by at least partially circumscribing the fluorescent image with a yellow border, as previously described. Fluorescent image enhancement program 140 can generally include any software capable of receiving a request for fluorescent image enhancement, subsequently adjusting the original print request data for such enhancement according to the present disclosure, and communicating with database 120, input record data 130, network 110, and printer 150.

Available image data 120 is a central storage for printing requests (i.e., data that represents images to be printed on front side f and/or back side d of one or more sheets). Available image data 120 can be implemented using any non-volatile storage medium known in the art. For example, authentication database can be implemented with a tape library, optical library, one or more independent hard disk drives, or multiple hard disk drives in a redundant array of independent disks (RAID). In some embodiments, available image data 120 receives print requests from a user via input data 130. In some embodiments, available image data 120 contains a set of data related to print requests (e.g., generic images that may be used very frequently).

Input data 130 is data inputted by a user, for example, a print request. The user may submit input data 130, or designate the appropriate data to be provided by available image data 120 (e.g., generic images that may be stored in available image data 120). The system, namely, fluorescent image enhancement environment 100, is responsive to input data 130 provided by a user or read from available image data 120. As will be explained in greater detail below, fluorescent image enhancement program 140 receives a printing request from available image data 120 and/or input data 130, detects the need for fluorescent ink in the printing request data, determines that fluorescent image enhancement is desired, and adjust the original print request data to enhance the fluorescent image.

Printer 150 is arranged to communicate with computing device 300 to produce prints. Printer 150 is capable of printing with either dry marking material (i.e., toner) or liquid marking material (i.e., ink). Additionally, printer 150 is capable of printing with either regular marking material or fluorescent marking material. It should be appreciated that, in some embodiments, computing device 300 and fluorescent image enhancement program 140 can be implemented within printer 150. That is to say, printer 150 may have a built-in computing device including fluorescent image enhancement program 140 thereon (e.g., a MFD programmable with software).

Figure 5:
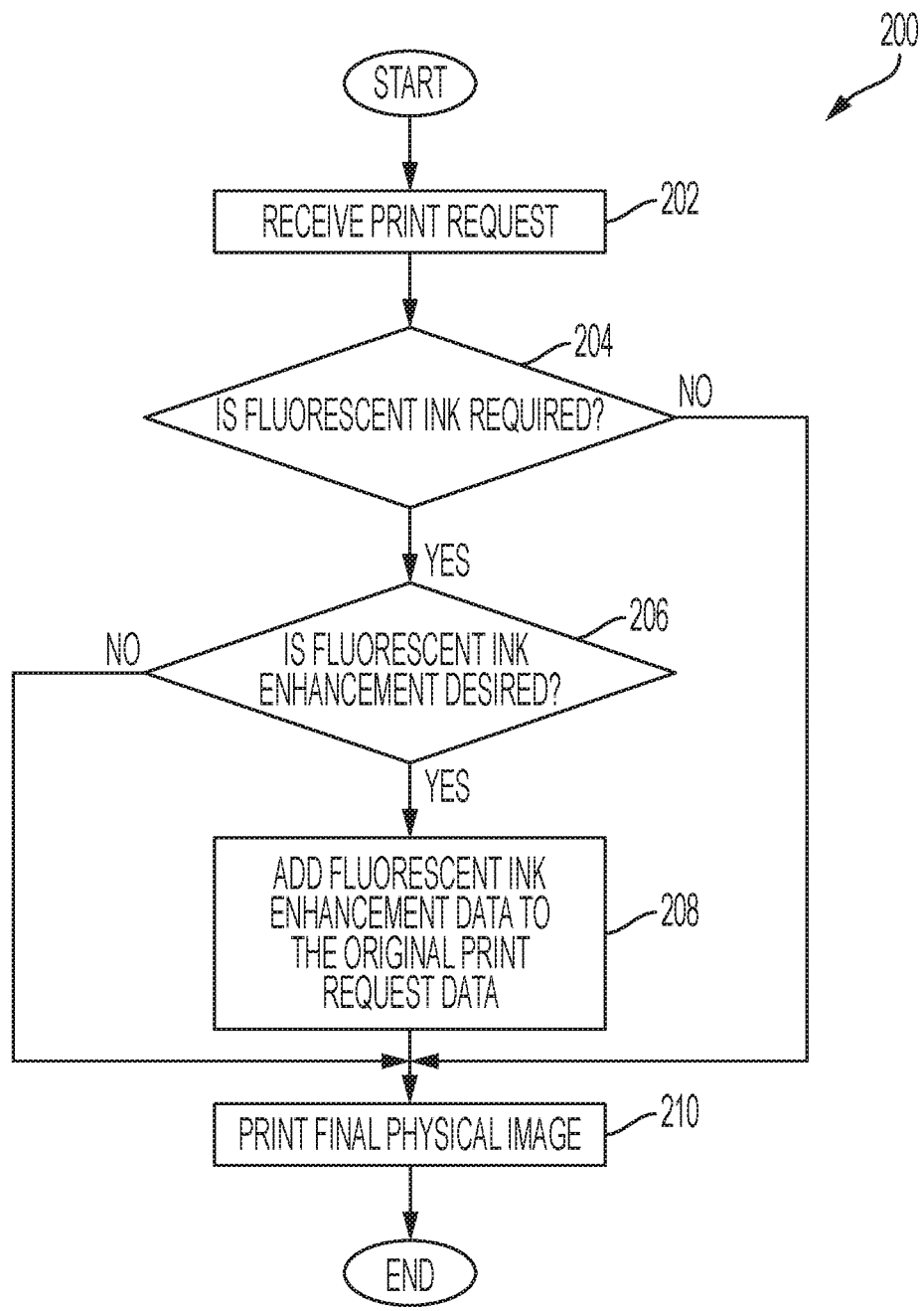
FIG. 5 is a flow chart depicting operational steps for enhancing a fluorescent image, in accordance with some embodiments of the present disclosure; and, FIG. 6 is a block diagram of internal and external components of a computer system, in accordance with some embodiments of the present disclosure.

FIG. 5 shows flow chart 200 depicting operational steps for enhancing a fluorescent image, in accordance with some embodiments of the present disclosure.

In step 202, fluorescent image enhancement program 140 receives one or more print requests. The print request includes data (i.e., original print request data) in the form of a digital image. As is known in the art, printer 150 uses a driver or specialized software to convert the file or digital image and create a physical image. The print request may come from continuous communication between fluorescent image enhancement program 140 and available image data 120 (i.e., fluorescent image enhancement program 140 continuously pulls image data from available image data 120 at a certain time interval, such as every five seconds), or from a specific signal sent from available image data 120 to fluorescent image enhancement program 140. In some embodiments, there are a plurality of print requests received by fluorescent image enhancement program 140 at a given time or spread about one or more times. In some embodiments, fluorescent image enhancement program 140 receives a request directly from a user via user input data 130.

In step 204, fluorescent image enhancement program 140, determines if fluorescent ink is required in the print request.

Specifically, fluorescent image enhancement program 140 analyzes the original print request data to determine whether fluorescent ink is needed to create the physical image. It should be appreciated that while step 204 refers to fluorescent "ink," it also envisions toner. Thus, the term "ink" in FIG. 5 refers to both liquid marking material (i.e., ink) and dry marking material (i.e., toner).

If, in step 204, fluorescent image enhancement program 140 determines that fluorescent ink is not required, then in step 210 fluorescent image enhancement program 140 prints, via printer 150, the final physical image.

If, in step 204, fluorescent image enhancement program 140 determines that fluorescent ink is required, then in step 206 fluorescent image enhancement program 140 determines whether fluorescent ink enhancement is desired. For example, fluorescent image enhancement program 140 displays a prompt: is fluorescent ink enhancement desired. In some embodiments, fluorescent image enhancement program 140 prompts the user via display 322 on computing device 300. In some embodiments, fluorescent image enhancement program 140 prompts the user via a graphic user interface (GUI) arranged on printer 150. In some embodiments, in step 206, fluorescent image enhancement program 140 further determines if a general fluorescent ink enhancement is desired (i.e., a non-fluorescing border completely circumscribing the fluorescent image) or if a specific fluorescent ink enhancement is desired (i.e., a non-fluorescing border only partially circumscribing the fluorescent image). If a specific fluorescent ink enhancement is desired, fluorescent image enhancement program 140 further determines for which portion(s) of the fluorescent image is enhancement desired, for example, by prompting an additional input from the user.

If, in step 206, fluorescent image enhancement program 140 determines that fluorescent ink enhancement is not desired, then in step 210 fluorescent image enhancement program 140 prints, via printer 150, the final physical image.

If, in step 206, fluorescent image enhancement program 140 determines that fluorescent ink enhancement is desired, then in step 208 fluorescent image enhancement program 140 adds fluorescent ink enhancement data to the original print request data. For example, and as previously described, the fluorescent image enhancement data may include a border comprising a normal non-fluorescing yellow marking material at least partially circumscribing the fluorescent image.

In step 210, fluorescent image enhancement program 140 prints, via printer 150, the final physical image. The final physical image or print is a conversion from the final digital image, which includes the original print request data as well as any data added by fluorescent image enhancement program 140, for example, fluorescent ink enhancement data. Put another way, step 210 includes the creation of the final physical print that includes the fluorescent image (and border).

Figure 6:
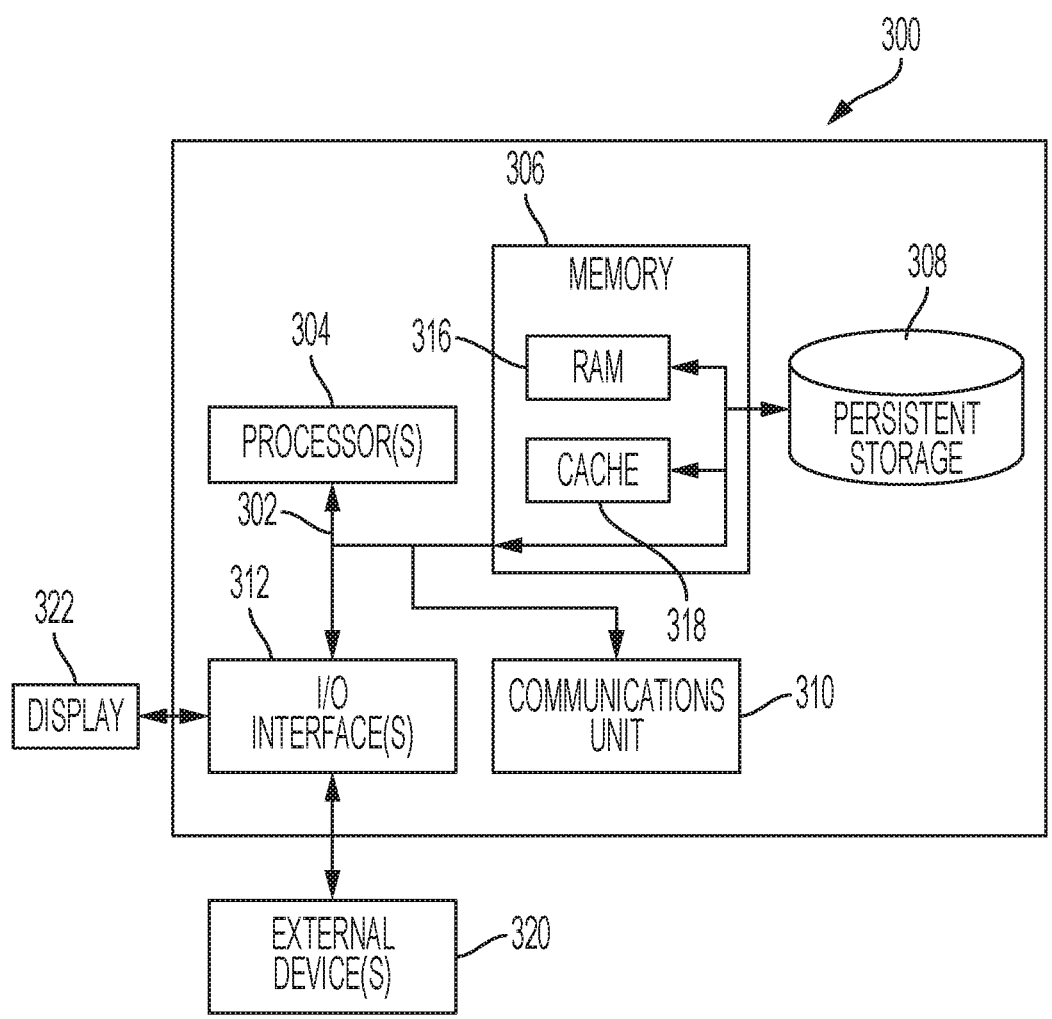

FIG. 6 is a block diagram of internal and external components of computing system 300, which is representative of the computing device of FIG. 4, in accordance with an embodiment of the present disclosure. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 300 includes communications fabric 302, which provides for communications between one or more processing units 304, memory 306, persistent storage 308, communications unit 310, and one or more input/output (I/O) interfaces 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 316 and cache memory 318. In general, memory 306 can include any suitable volatile or non-volatile computer readable storage media. Software is stored in persistent storage 308 for execution and/or access by one or more of the respective processors 304 via one or more memories of memory 306.

Persistent storage 308 may include, for example, a plurality of magnetic hard disk drives. Alternatively, or in addition to magnetic hard disk drives, persistent storage 308 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 310 provides for communications with other computer systems or devices via a network. In this exemplary embodiment, communications unit 310 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present disclosure can be downloaded to computing device 300 through communications unit 310 (i.e., via the Internet, a local area network, or other wide area network). From communications unit 310, the software and data can be loaded onto persistent storage 308.

One or more I/O interfaces 312 allow for input and output of data with other devices that may be connected to computing device 300. For example, I/O interface 312 can provide a connection to one or more external devices 320 such as a keyboard, computer mouse, touch screen, virtual keyboard, touch pad, pointing device, or other human interface devices. External devices 320 can also include portable computer readable storage media such as, for example, thumb drives, portable optical or magnetic disks, and memory cards. I/O interface 312 also connects to display 322.

Display 322 provides a mechanism to display data to a user and can be, for example, a computer monitor. Display 322 can also be an incorporated display and may function as a touch screen, such as a built-in display of a tablet computer.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Substrate
12 Substrate
20 Image
22 Image
30 Border
32 Border
100 Fluorescent image enhancement environment
110 Network
120 Available image data
130 Input data
140 Fluorescent image enhancement
150 Printer
200 Flow chart
202 Step
204 Step
206 Step
208 Step
210 Step
300 Computing device
302 Communications fabric
304 Processing units
306 Memory
308 Persistent storage
310 Communications unit
312 Input/output (I/O) interfaces
316 Random access memory (RAM)
318 Cache memory
320 External device(s)
322 Display
T Thickness

What is claimed is:

1. A method of enhancing a fluorescent image on a substrate,
    the method comprising:
    receiving, by one or more computer processors, a digital image;
    determining, by the one or more computer processors, whether fluorescent ink is required for the digital image;
    if fluorescent ink is required, determining, by the one or more computer processors, whether fluorescent ink enhancement is desired by a user; and,
    if fluorescent ink enhancement is desired by the user, adding, by the one or more computer processors, a border including a non-fluorescing marking material at least partially circumscribing the digital image, on said substrate.

2. The method as recited in claim 1, further comprising: printing a final physical image.

3. The method as recited in claim 1, further comprising: if fluorescent ink is not required, printing a final physical image.

4. The method as recited in claim 1, further comprising:
if fluorescent ink enhancement is not desired, printing, by the one or more computer processors, a final physical image.

5. The method as recited in claim 1, further comprising:
if fluorescent ink enhancement is desired, determining, by the one or more computer processors, whether fluorescent ink enhancement is desired for an entirety of the digital image.

6. The method as recited in claim 1, wherein the non-fluorescing marking material is yellow.

7. The method as recited in claim 1, wherein the non-fluorescing marking material is yellow and has
a halftone level of greater than or equal to 30%.

8. The method as recited in claim 1, wherein the non-fluorescing marking material is yellow and has
a constant thickness that is greater than or equal to 0.25 mm.

9. The method as recited in claim 1, wherein the non-fluorescing marking material is yellow and has
a variable thickness that is greater than or equal to 0.25 mm.

* * * * *